United States Patent [19]
Larson et al.

[11] Patent Number: 5,189,717
[45] Date of Patent: Feb. 23, 1993

[54] OPTICAL FIBER SPLICE

[75] Inventors: Donald K. Larson, Cedar Park; Richard A. Patterson, Georgetown, both of Tex.

[73] Assignee: Minnesota Mining and Manufacturing Company, St. Paul, Minn.

[21] Appl. No.: 750,401

[22] Filed: Aug. 29, 1991

Related U.S. Application Data

[63] Continuation-in-part of Ser. No. 692,271, Apr. 26, 1991, Pat. No. 5,102,212, which is a continuation of Ser. No. 437,027, Nov. 15, 1989, Pat. No. 5,013,123, which is a continuation-in-part of Ser. No. 305,471, Feb. 1, 1989, abandoned, which is a continuation of Ser. No. 182,872, Apr. 18, 1988, Pat. No. 4,824,197.

[51] Int. Cl.$^5$ ............................ G02B 6/00; G02B 6/36
[52] U.S. Cl. ............................................. 385/95
[58] Field of Search ............................ 385/95, 96–99

[56] References Cited

U.S. PATENT DOCUMENTS

| | | | |
|---|---|---|---|
| 3,864,018 | 1/1975 | Miller | 350/96 |
| 4,028,162 | 6/1977 | Cherin et al. | 156/158 |
| 4,029,390 | 6/1977 | Chinnock et al. | 350/96.20 |
| 4,045,121 | 8/1977 | Clark | 350/96.20 |
| 4,046,454 | 9/1977 | Pugh, III | 350/96.20 |
| 4,102,561 | 7/1978 | Hawk et al. | 350/96.21 |
| 4,181,401 | 1/1980 | Jensen | 350/96.21 |
| 4,201,443 | 5/1980 | Hodge | 350/96.20 |
| 4,203,650 | 5/1980 | Millet et al. | 350/96.21 |
| 4,211,470 | 7/1980 | Stewart | 350/96.21 |
| 4,220,397 | 9/1980 | Benasutti | 350/96.21 |
| 4,254,865 | 3/1981 | Pacey et al. | 206/316 |
| 4,257,674 | 3/1981 | Griffin et al. | 350/96.21 |
| 4,258,977 | 3/1981 | Lukas et al. | 350/96.21 |
| 4,274,708 | 6/1981 | Cocito et al. | 350/96.21 |
| 4,300,815 | 11/1981 | Malsot et al. | 350/96.20 |
| 4,325,607 | 4/1982 | Carlsen | 350/96.21 |
| 4,339,172 | 7/1982 | Leather | 350/96.21 |
| 4,352,542 | 10/1982 | Tydings | 350/96.21 |
| 4,353,542 | 10/1982 | Schultz | 350/96.21 |
| 4,354,731 | 10/1982 | Mouissie | 350/96.21 |
| 4,391,487 | 7/1983 | Melman et al. | 350/96.20 |
| 4,435,038 | 3/1984 | Soes et al. | 350/96.21 |
| 4,470,180 | 9/1984 | Blomgren | 24/563 |
| 4,593,971 | 6/1986 | Clement et al. | 350/96.20 |
| 4,602,845 | 7/1986 | Anderton | 350/96.20 |
| 4,634,216 | 1/1987 | Calevo et al. | 350/96.21 |
| 4,730,892 | 3/1988 | Anderson et al. | 350/96.21 |
| 4,740,411 | 4/1988 | Mitch | 428/178 |
| 4,865,413 | 9/1989 | Hubner et al. | 350/96.21 |
| 4,871,227 | 10/1989 | Tilse | 350/96.21 |
| 4,930,859 | 6/1990 | Hoffman, III | 350/96.21 |
| 4,940,307 | 7/1990 | Aberson et al. | 350/96.21 |
| 4,973,126 | 11/1990 | Degani et al. | 350/96.21 |
| 5,016,970 | 5/1991 | Nagase et al. | 350/96.21 |

FOREIGN PATENT DOCUMENTS

| | | | |
|---|---|---|---|
| 82102571.5 | 12/1985 | European Pat. Off. | 6/24 |
| 88303777.2 | 11/1988 | European Pat. Off. | 6/38 |
| 52-19547 | 2/1977 | Japan . | |
| 53-26142 | 3/1978 | Japan . | |
| 58-9114 | 1/1983 | Japan . | |
| 58-158621 | 9/1983 | Japan . | |

OTHER PUBLICATIONS

Publishes by Reliance Comm/Tec, copyright date of 1991, Titled "Reliable Corelink TM Tomorrow's Fiber Optic Splice Today!" Author: E. C. Scholtens.

*Primary Examiner*—Akm E. Ullah
*Attorney, Agent, or Firm*—Gary L. Griswold; Walter N. Kirn; Jack V. Musgrove

[57] ABSTRACT

An optical fiber splice comprising a hinged splice element having two legs, at least one of the legs having a groove therein for holding the fibers to be spliced, and an index matching gel disposed between the legs. In the embodiment wherein the legs remain divergent or slightly open in the clamping state, a vent hole is punched in the center of the splice element to minimize migration of the gel between the inner and outer surfaces of the elements near the fiber interface, which could otherwise increaase insertion loss due to the migration of microbubbles, particularly during temperature cycling. A vent channel may optionally be formed in the splice element to provide fluid communication between the groove and the vent hole. In the embodiment wherein the legs are essentially parallel and in intimate contact in the clamping state, rails may be provided in one leg opposite leg with the groove whereby the rails impinge on either side of the groove and block the flow of the index matching gel.

18 Claims, 3 Drawing Sheets

OPTICAL FIBER SPLICE

CROSS-REFERENCE TO RELATED APPLICATION

This application is a continuation-in-part of U.S patent application Ser. No. 07/692,271 filed Apr. 26, 1991 now U.S. Pat. No. 5,102,212, which is a continuation of U.S. patent application Ser. No. 07/437,027 filed on Nov. 15, 1989, now U.S. Pat. No. 5,013,123, which is a continuation-in-part of U.S. patent application Ser. No. 07/305,471 filed on Feb. 1, 1989, (abandoned), which is a continuation of U.S. patent application Ser. No. 07/182872 filed Apr. 18, 1988, now U.S. Pat. No. 4,824,197.

BACKGROUND OF THE INVENTION

1. Field of the Invention

The present invention generally relates to devices for optically splicing waveguides such as optical fibers, and more particularly to a vented, hinged splice element having improved hinge registration and clamping of the optical fiber.

2. Description of the Prior Art

Splices for optical fibers are known in the art. The most critical characteristic of an optical fiber splice is its insertion loss, i.e., the signal loss due to misalignment of the fibers, which may occur in three different manners. First of all, the fiber end faces should abut each other as closely as possible (end offset). The provision of a refractive index matching medium (gel) at the interface may mitigate the effects of any air space left between the end faces. Secondly, the fiber axes proximate the interface should be generally parallel, so that light exiting one fiber will strike the surface of the second fiber as closely as possible to a right angle, or 0° angle of incidence (axial or angular offset). Finally, the axes of the fibers should be transversely aligned to maximize the overlapping surface area between the end faces (lateral or transverse offset). This alignment is critical since the diameter of the central glass core of single mode fibers is only about 8 $\mu$m, so a deviation in axial alignment of as little as 1 $\mu$m may result in a significant loss.

Several prior art optical fiber splicing devices attempt to optimize fiber alignment by utilizing a chip or tray having one or more grooves therein which receive the optical fibers. See, e.g., U.S. Pat. Nos. 3,864,018; 4,028,162; 4,046,454; 4,102,561; 4,220,397; 4,730,892; and 4,865,413. The grooves in the substrate provide a simple method for holding the fibers, which are forcibly held in the grooves by a compression plate or adjacent groove tray, or by the use of adhesives. The grooves may be concave or V-shaped. Concave grooves result in two primary points of contact with the fiber, while a V-groove with an opposing flat surface provides three points of contact. V-grooves in two opposing trays result in four points of contact, as shown in FIG. 4 of U.S. Pat. No. 4,046,454.

Some prior art splices combine the V-groove concept with a foldable or hinged splice element. See, e.g., U.S. Pat. Nos. 4,029,390; 4,254,865; 4,818,055; and 4,865,412; and Japanese Patent Applications (Kokai) Nos. 53-26142 and 58-158621. This basic design offers several advantages, including ease of manufacture (via stamping), low insertion force (preventing buckling or deformation of the fibers), fiber retention without the use of adhesives or epoxies, and reusability.

In spite of the foregoing achievements, however, the mass splicing of fibers in a reliable, quick and economic fashion remains a problem. For example, prior art hinged splice elements do not always bend along the same line on the splice element, and there is a high rejection rate during production. Without precise folding of the element, parallel to the fiber receiving grooves, fiber alignment and retention is affected since it results in inaccurate registration of the two halves of the splice element, and is especially critical when the two halves have complimentary V-grooves. It has also been found that ductile hinge elements, such as that disclosed in U.S. Pat. No. 4,824,197 (not prior art), require an annealing step after embossing in order to provide a hinge which will consistently survive a 180° fold.

The sudden clamping transition near the fiber interface also causes deformation of the fiber resulting in more signal loss than if there were a more gradual clamping toward the interface.

Prior art optical splices also do not adequately address the optimum geometry for V-groove designs. For example, in the previously referred to FIG. 4 of U.S. Pat. No. 4,046,454, the V-grooves have obtuse angles, meaning that the four points of contact will not be completely symmetrical about the fiber. This may result in unnecessary transverse offset of the fibers, leading to greater splice loss. This is also true for hinged splice elements wherein a flat surface compresses the fiber into a 60° V-groove. Since the flat surface is hinged to the grooved surface, and since the fiber is only partially embedded in the groove, the flat surface is not parallel to the groove-bearing surface when the splice element is in its closed, clamping state. See, e.g., U.S. Pat. No. 5,013,123 (this patent does not constitute prior art). Since these two surfaces are not parallel, the three lines or surfaces contacting the fiber will not be symmetrically positioned about the fiber, again adversely affecting transverse offset of the fiber end faces.

One final disadvantage relating to prior art optical splices concerns the use of a medium for matching the index of refraction of the two fibers. As mentioned above, reflective losses may be minimized by placing an index matching fluid or gel at the fiber interface. Oftentimes, however, this gel has bubbles, contaminants or other discontinuities which tend to migrate during the splice operation, and thereafter with temperature cycling. Such migration of the gel and microbubbles can detrimentally affect the splice quality. It would, therefore, be desirable and advantageous to devise an optical splice element which would obviate any problems associated with gel migration, as well as overcome the aforementioned limitations regarding a predictable hinge fold line, optimum V-groove geometry, and gradual clamping of the splice element.

SUMMARY OF THE INVENTION

The foregoing objective is achieved in an optical splice element comprising a thin sheet of deformable material having on one surface thereof a notched web forming a focus hinge connecting two leg portions of the sheet, and providing an accurate and predictable fold line. At least one of the leg portions has a V-groove embossed therein, and the other of the leg portions has either another V-groove or a contact surface positioned so as to lie adjacent the V-groove on the first leg portion when the legs are folded toward one another along the fold line defined by the longitudinal notch. Means are provided to gradually clamp the central portions of the legs to minimize insertion loss from a sudden clamping transition.

Optimum V-groove geometry is achieved by offsetting the angle of the V-grooves with respect to the plane of the leg, or by offsetting the angle of the contact surface. The value of the interior angle of the V-groove(s) depends upon the number of points or lines which will contact the fiber placed in the groove. This value may be decreased slightly whereby, when the fiber is clamped between the legs and the ductile surface of the V-groove deforms, the deformation results in an effective angle corresponding to the desired optimum angle. A vent hole is provided at the center of the splice element to prevent migration of microbubbles in the index matching gel across the fiber interface. Alternatively, sealing rails may be formed on one leg if the surfaces of the two legs are in intimate contact when the element is in a closed, clamping state.

BRIEF DESCRIPTION OF THE DRAWINGS

The novel features and scope of the invention are set forth in the appended claims. The invention itself, however, will best be understood by reference to the accompanying drawings, wherein:

DESCRIPTION OF THE PREFERRED EMBODIMENT

Figure 1:
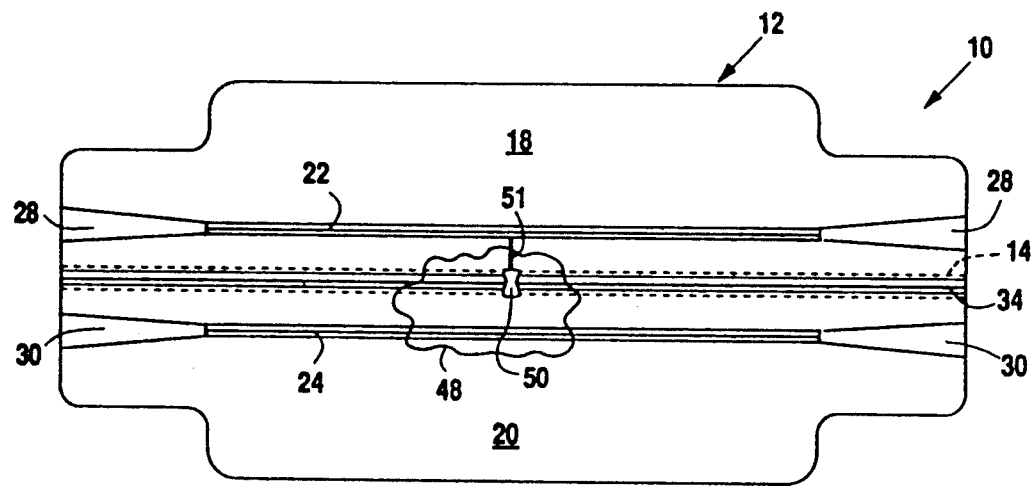
FIG. 1 is a top plan view of the splice element of the present invention in its unfolded state.

With reference now to the figures, and in particular with reference to FIG. 1, there is depicted the optical fiber splice element 10 of the present invention. Splice element 10 is somewhat similar to the splice elements described in U.S. Pat. Nos. 4,824,197 and 5,013,123, the disclosures of which are hereby incorporated by reference. Splice element 10 is formed from a sheet 12 of deformable material, preferably a ductile metal such as aluminum, although polymeric materials may also be used, such as polyethersulfone. Material selection is described further below. Although the term "connector" may be applied to splice element 10, that term is usually reserved for devices which are intended to provide easy connection and disconnection, as opposed to a splice which is usually considered permanent. Nevertheless, the term "splice" should not be construed in a limiting sense since splice element 10 can indeed allow removal of the spliced fiber.

Figure 2:
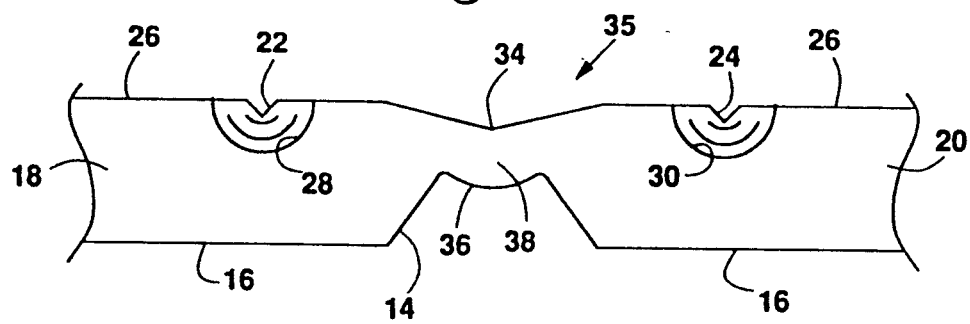
FIG. 2 is a side elevational view of the splice element in its unfolded state, showing the focus hinge defined by a longitudinal notch.

With further reference to FIG. 2, certain features of splice element 10 are embossed, coined, stamped or molded into sheet 12. First of all, a groove 14 is formed on the outside surface 16 of sheet 12, extending generally the length of sheet 12. Groove 14 is centrally located, forming an area of reduced thickness which defines a hinge that separates sheet 12 into two identical plate-like members or legs 18 and 20. In one embodiment of the present invention, both of these legs have V-shaped grooves 22 and 24 embossed on the inside surface 26 of sheet 12. It should be noted that it is not necessary for the grooves to have a sharp angle in order to be considered V-shaped; given the small dimensions involved, the apex of the "V" may be somewhat curved or even flattened out, but the overall shape is still generally that of a "V." V-grooves 22 and 24 are generally parallel with groove 14, and equidistant therefrom, but do not extend the full length of sheet 12. Concave recesses 28 and 30 lie adjacent grooves 22 and 24, respectively, whereby, when legs 18 and 20 are folded together (as shown in FIG. 3), recesses 28 and 30 form a lead-in cone for an optical fiber 32.

A key feature of the present invention involves improvements in the hinge which provide a fold line allowing precise transverse registration of V-grooves 22 and 24. The essential improvement in this regard is the provision of another groove or notch 34 on surface 26, opposite groove 14. Notch 34, which preferably takes the shape of a shallow "V," lies above the centerline of groove 14. Empirical testing has shown that provision of such a focus hinge 35 provides more accurate registration of legs 18 and 20 than if notch 34 were not present, to within about ±30 μm (3 σ). Moreover, the registration is very predictable and repeatable, making the folding step non-critical. Focus hinge 35 may be utilized to register any kind of groove, not only those that are V-shaped. Even if only one of the legs 18 or 20 had a groove therein, obviating the need for alignment of opposing grooves, it would still be desirable to use focus hinge 35 to provide optimum registration of recesses 28 and 30 in order to form a proper lead-in cone.

The added predictability in the use of focus hinge 35 may be further enhanced by cutting or embossing groove 14 in such a manner as to form a convex surface 36 on one side of the hinge web 38. This forms a partial bend radius at the hinge, and allows hinge web 38 to be thicker without hampering the bending qualities. The increased thickness in turn imparts structural integrity and, in testing, this hinge has survived full closing and reopening without failure. The splice elements shown in the previously mentioned U.S. Pat. Nos. 4,824,197 and 5,013,123 require only a 90° bend at each hinge, but the hinge in splice element 10 must survive a bend of nearly 180°; the splice elements shown in those patents require a post-embossing annealing step to survive such a fold, but this is not necessary with focus hinge 35.

Figure 3:
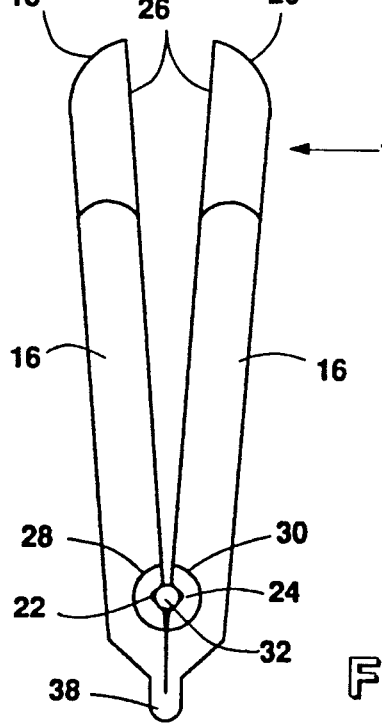
FIG. 3 is a side elevational view of the splice element in its folded state, with a fiber disposed in the V-grooves.

Referring now to FIG. 3, optical fiber splice element 10 is depicted in its closed state, clamping a fiber 32 between V-grooves 22 and 24 of legs 18 and 20. Splice element 10 may be preloaded in the folded state (although not in the closed, clamping state) in an optical splice connector body such as that shown in U.S. Pat. No. 4,818,055 (the disclosure of which is hereby incorporated). Such a splice body includes a base and a cap. As the cap is moved from an open position to a closed position, two cam bars slide over legs 18 and 20, urging them toward one another. It is desirous to provide rounded edges along outside surface 16 of legs 18 and 20 to facilitate the camming action.

Sheet material 12 should be sufficiently deformable so as to partially conform to the surface of optical fiber 32 at the points of contact. In addition to improved signal transmission, this also results in greater fiber retention and facilitates splicing of two fibers of differing diameters. Sheet 12 may therefore be constructed from a variety of ductile metals, such as soft aluminum. The preferred metal is an aluminum alloy conventionally known as "3003," having a temper of 0 and a hardness on the Brinnell scale (BHN) of between 23 and 32. Another acceptable alloy is referred to as "1100," and has a temper of 0, H14 or H15. Acceptable tensile strengths vary from 35 to 115 megapascals.

Other metals and alloys, or laminates thereof, may be used in the construction of sheet 12. Such metals include copper, tin, zinc, lead, indium, gold and alloys thereof. It may be desirable to provide a transparent splicing element to facilitate the splicing operation. In such a case, a clear polymeric material may be used for sheet 12. Suitable polymers include polyethylene terephthalate, polyethylene terephthalate glycol, acetate, polycarbonate, polyethersulfone, polyetheretherketone, polyetherimide, polyvinylidene fluoride, polysulfone, and copolyesters such as VIVAK (a trademark of Sheffield Plastics, Inc., of Sheffield, Mass).

As an alternative to providing a sheet constructed of a deformable material, sheet 12 may instead be constructed of a more rigid material provided that the V-grooves and contact surfaces are lined or coated with a deformable material. The primary requisite is to provide a material which is softer than the glass comprising the optical fiber and cladding, and which is ductile under the clamping pressures applied to the optical fiber. It is also desirable that the material be elastic at low stress levels to afford sufficient elasticity to maintain a continual compressive force on the optical fibers once legs 18 and 20 have been brought together. Furthermore, a coating may be applied to the ductile material to reduce skiving of the material as the fiber is inserted. For example, an obdurate coating having a thickness in the range of one to two $\mu$m may be applied to surface 26 of splice element 10.

The dimensions of sheet 12 may vary considerably depending upon the application; the following dimensions are considered exemplary and are not to be construed in a limiting sense. The size of sheet 12 is about 18 mm long by 8 mm wide along the major edges. For both metal and polymeric materials, the preferred thickness is about 0.51 mm. The width of notch 34 is about 0.56 mm while its maximum depth, measured from surface 26, is about 0.1 mm. The width of groove 14 is approximately 1.1 mm measured across surface 16, and 0.46 mm measured across hinge web 38; its maximum depth, measured from surface 16, is about 0.33 mm. Convex surface 36 has a radius of curvature of about 0.39 mm. Based on the foregoing values, V-grooves 22 and 24 are preferably placed about 0.9 mm from the fold line defined by notch 34. V-grooves 22 and 24 should have a maximum width of about 129 $\mu$m.

Figures 4A, 4B:
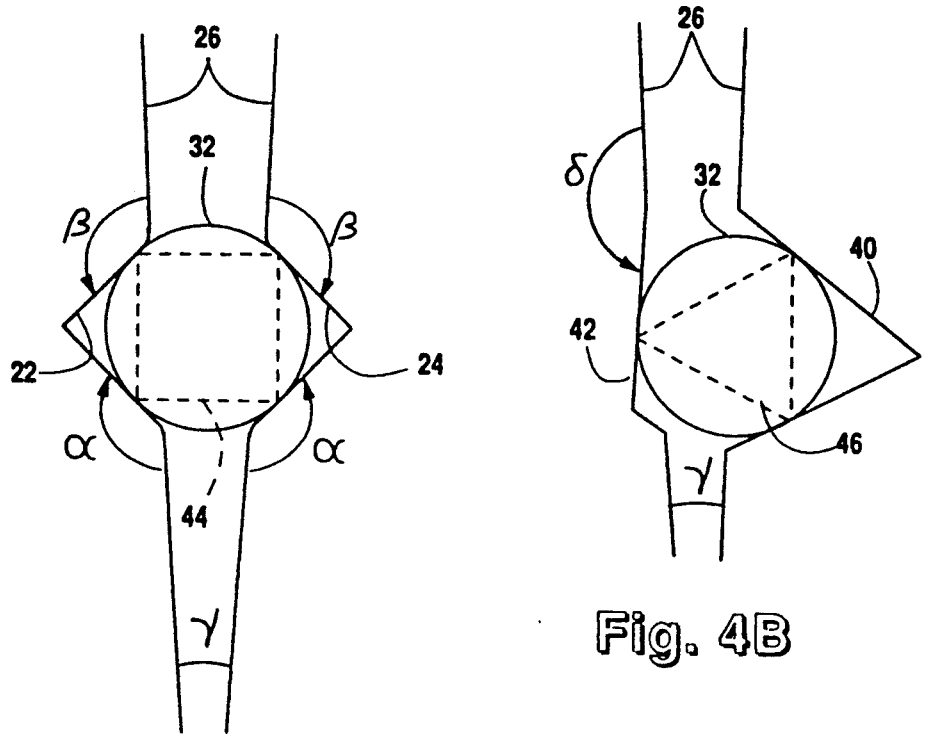
FIGS. 4A and 4B are detail diagrams depicting the angular geometry of the V-grooves and contact surface.

FIGS. 4A and 4B illustrate the novel angular geometries of the V-grooves used in splice element 10. As noted in the Description of the Prior Art, prior art splices having V-grooves do not clamp the fiber in a completely symmetrical fashion, resulting in unnecessary fiber deformation and greater splice loss. Splice element 10, in contrast, optimizes the radial alignment of forces impacting the fiber by counterbalancing the locations of the splice-fiber interfaces. In splice element 10, where the legs 18 and 20 are still separated by a small angle in the closed, clamping state, this is accomplished by offsetting the V-groove angles with respect to the plane of surface 26.

In FIG. 4A, V-grooves 22 and 24 have interior right angles, but the angles $\alpha$ and $\beta$ are not equal. Rather, they are chosen to complement the angular separation of legs 18 and 20. Specifically, in the embodiment where legs 18 and 20 are separated by an angle $\gamma$ of about 6° in the closed, clamping state, the angles $\alpha$ are about 138°, i.e, the supplementary angles of inclination are about 42°. The angles $\beta$ are accordingly about 132°, i.e., the supplementary angles of inclination are about 48°. It can be seen that these angles (for two opposing V-grooves) are determined by the equations $\alpha = 135° + \gamma/2$, and $\beta = 135° - \gamma/2$. It would, of course, be equivalent to make both angles of inclination of one V-groove 45° and provide the angular offset in the second V-groove, i.e., making its angle $\alpha = 135° + \gamma$, and its angle $\beta = 135° - \gamma$.

In the embodiment of FIG. 4B (which is presently considered to be the preferred embodiment), there is only one V-groove 40 with an interior angle of 60° (and angles of inclination with respect to surface 26 also of 60°). A complementary contact surface 42 is provided which has an angular offset $\delta$ with respect to surface 26 (contact surface 42 is thus "groove" as that term is used in the claims). The angle $\delta$ is simply $180° - \gamma$ ($\gamma$ is again preferably 6°). Another way of expressing these constructions is that, even though the two surfaces 26 are not parallel, the points of contact between splice element 10 and fiber 32 form an essentially regular polygon, such as the square 44 in FIG. 4A and the equilateral triangle 46 in FIG. 4B. The basic principle of offsetting the angular geometries of the grooves may also be applied to splices having more than four contact points. Focus hinge 35 also enhances the usability of such multiple surface clamps, as well as grooves having a semicircular cross-section. Optimizing these geometries also provides improved alignment of different sized fibers.

Upon reference to the description provided herein, those skilled in the art will appreciate that, since the optical fiber may become slightly embedded in a groove formed of a ductile material, it may be desirable to provide an initial groove angle slightly less than that ultimately desired for symmetric alignment of the fiber within the groove. For example, if splice element 10 uses two opposing V-grooves as shown in FIG. 4A, the interior groove angles should actually be slightly less than 90°. In this manner, when the fiber is clamped between legs 18 and 20, the ductile material along the surfaces of V-grooves 22 and 24 will deform at the points of contact with fiber 32, yielding an effective angle of about 90°. In this regard, the term "effective angle" refers to that angle defined by the apex of the V-groove and the points of maximum deformation of the ductile material where it contacts the fiber. Similarly, if the splice utilizes only one V-groove, as shown in FIG. 4B, the interior angle should be slightly less than 60°.

Figure 5:
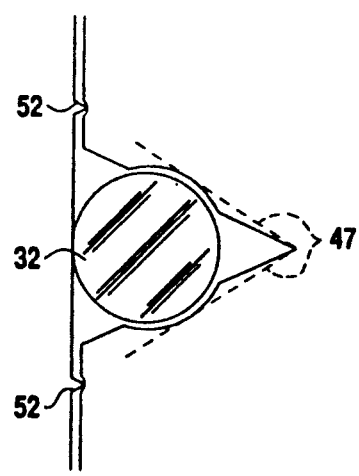
FIG. 5 is a detail diagram illustrating the provision of a smaller V-groove angle to compensate for the deformation of the ductile surface of the V-groove, and also showing rails which provide sealing of the index matching gel.

This is further depicted in FIG. 5, which shows a splice element wherein the inner surfaces of the legs are essentially parallel when the element is in the closed clamping state. FIG. 5 illustrates the deformation of the V-groove surfaces, and how the initial angle formed in the V-groove differs from the effective angle which is indicated by dashed lines 47. While the value of the interior V-groove angle depends primarily on the amount of ductile material which is displaced, this in turn depends upon the malleability of the material comprising the surfaces of the V-groove and the driving force which urges fiber 32 into the V-groove. Since a wide variety of materials may be used for splice element 10, and since there are several different mechanisms for applying the clamping force to the element, it is impossible to provide a single value for the interior angle which will result in an optimum effective angle. In the preferred embodiment of FIG. 4B, utilizing the clamping cap described below, an angle in the range of 46°-59° has been empirically found to approximately yield the optimum effective V-groove angle of 60°.

Referring back to FIG. 1, splice element 10 preferably has a gel 48 disposed therein which has an appropriate index of refraction to improve transmission of light across the fiber-to-fiber interface. Such gels are conventionally available. As noted in the Description of the Prior Art, the use of such a gel may result in the detrimental migration of microbubbles or other contaminants along the fiber-to-fiber interface. Such migration may be arrested by the provision of a vent hole 50 near the center of splice element 10. Venting the area below focus hinge 35, adjacent the fiber interface, eliminates the pressure differential which would otherwise cause gel migration across the interface, particularly during temperature cycling. Vent hole 50 may be punched into sheet 12 when splice element 10 is cut out; subsequent embossing of the various grooves and notches typically results in an hourglass shape of vent hole 50. In the preferred embodiment, vent hole 50 has a diameter of about 0.76 mm. A longitudinal vent channel 51 may optionally be embossed in surface 26 between vent hole 50 and grooves 22 and 24 to provide fluid communication between vent hole 50 and the grooves.

As an alternative to providing a vent hole, means may be provided to block the flow of the index matching gel, such as providing a barrier on either side of the V-groove proximate the fiber interface, rather than preventing the flow by eliminating any pressure differentials. For example, in the embodiment of FIG. 5, wherein the inner surfaces of the legs are in intimate contact when the element is in the closed, clamping state, features may be formed in one or both of the legs to providing sealing around the V-groove. One such means is a pair of ribs or rails 52 formed on the surface of one of the legs. Thus, when the element is closed, rails 52 impinge on the opposing surface, causing slight deformation thereof, and provide an environmental seal which prevents gel migration near the fiber interface.

Figure 6:
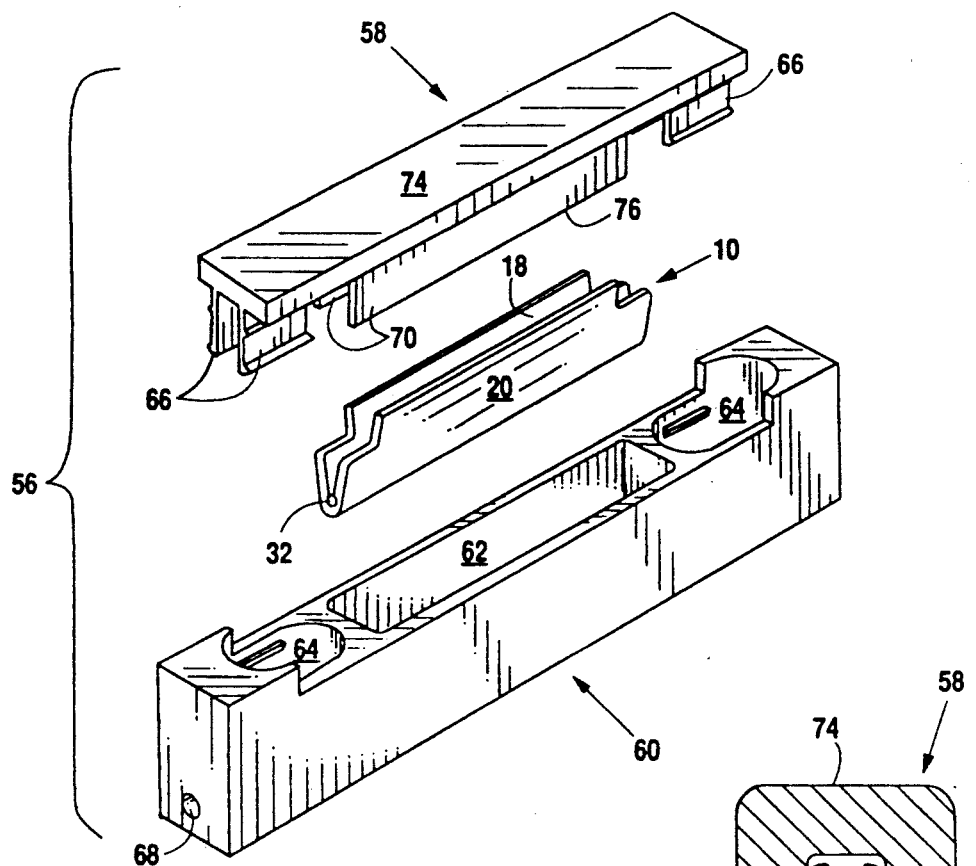
FIG. 6 is an exploded perspective view of the complete splice of the present invention, including the splice body and splice element.
Figure 8:
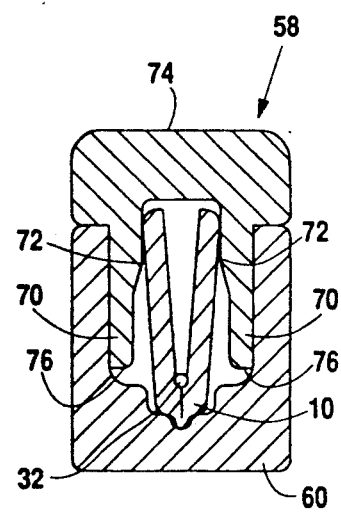
FIG. 8 is a cross-section taken along the center of the closed splice depicting clamping of the splice element.
Figure 7:
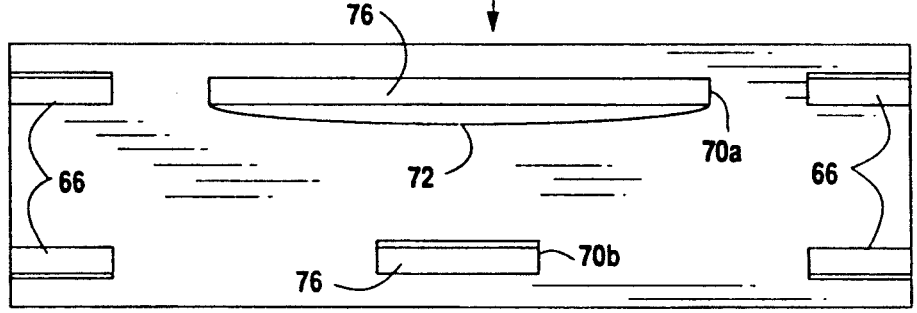
FIG. 7 is a bottom plan view of the cap of the splice body of the present invention.

Turning to FIGS. 6-8, those figures depict the novel splice body 56 which is used to hold and actuate splice element 10. Splice body 56 is essentially identical to the splice body described in U.S. Pat. No. 4,818,055, except for the provision of a gradual or centralized clamping cam as discussed further below. Splice body 56 includes a cap member 58 and a base member 60. Base 60 has an opening or central cavity 62 therein for receiving splice element 10, and two side cavities 64 for receiving locking tabs 66 of cap 58. Locking tabs 66 securely attach cap member 58 to base member 60. The end walls of base 60 further have holes 68 therein which allow the insertion of the optical fiber into the preassembled splice.

In addition to locking tabs 66, cap 58 also has two generally parallel camming bars 70 which extend perpendicularly into cavity 62 and surround splice element 10. Locking tabs 66 and camming bars 70 are preferably integrally molded with cap member 58. In the preassembled state, cap 58 is not fully inserted into base 60, allowing element 10 to remain in a slightly opened state, with the legs diverging, facilitating insertion of the optical fiber into the V-grooves thereof. Then, as cap 58 is forced fully into base 60, camming bars 70 forcibly contact legs 18 and 20 of element 10, forcing them towards one another and clamping the optical fiber.

The improvement in splice body 56 lies in the gradual thickening of the camming surfaces 72 of camming bars near their center, as with camming bar 70a shown in FIG. 7, which is a bottom plan view of cap 58. The cross-section of FIG. 8 is taken at the center of the actuated splice, and additionally illustrates how camming bars 70 are thinner at their distal edges 76 than at the point of attachment to upper plate 74. In other words, camming bar 70a defines an inwardly facing convex surface 72 where it joins the upper plate 74 of cap member 58. Alternatively, the camming bars may be much shorter in length than splice element 10, such as camming bar 70b. In this manner, element 10 is allowed to flex open at its ends, and there is a gradual clamping of the fiber towards the center. Both of these constructions have been found to decrease insertion loss associated with the microbends or deformations of the fiber which are found in other optical fiber splices. If camming bars such as 70a are used, they are preferably about 18 mm long, and the minimum distance between the bars, at their center, is about 1.3 mm. It is understood that gradual clamping may also be achieved if only one of the camming bars is so curved or thickened, the other having a flat inwardly facing surface. In the preferred embodiment, however, camming bars such as 70b are used and are about 6.4 mm long, again with a distance between the bars of about 1.3 mm. The improved camming bars 70a and 70b may be used with splice element 10, or with the splice element shown in U.S. Pat. No. 4,818,055, or with other splice elements requiring the clamping of two opposing legs or plate-like members.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. For example, splice element 10 may be provided with tabs similar to that shown in U.S. Pat. No. 4,824,197 for securing the element in a closed state. Splice element 10 may also contain multiple grooves for splicing more than one fiber pair. It is therefore contemplated that the appended claims will cover such modifications that fall within the true scope of the invention.

I claim:

1. An article for splicing two optical fibers together, comprising:

a splice element having a hinge defining first and second generally planar leg members, said splice element and leg members having inside and outside surfaces;

said first and second leg members having means for holding a fiber therebetween;

refractive index matching means disposed on said inside surfaces of said first and second leg members; and means for minimizing migration of said refractive index matching means near an interface between the fibers.

2. The article of claim 1 wherein said means for minimizing migration of said refractive index matching means comprises a vent hole through said splice element, said vent hole minimizing pressure differentials between said inside surface and said outside surface of said splice element.

3. The article of claim 1 wherein:
said means for holding a fiber between said first and second leg members comprises at least one groove formed in said inside surface of one of said leg members; and
said means for minimizing migration of said refractive index matching means comprises a vent hole through said splice element proximate said groove.

4. The article of claim 1 wherein said refractive index matching means comprises a gel which is placed in said splice element along said inside surface thereof.

5. The article of claim 1 wherein said vent hole extends through said hinge of said splice element.

6. The article of claim 2 wherein said vent hole is in the center of said splice element.

7. The article of claim 3 wherein said splice element further has a vent channel formed therein providing fluid communication between said vent hole and said groove.

8. The article of claim 4 wherein said means for minimizing migration of said refractive index matching means comprises means for blocking flow of said gel around the fiber interface.

9. The article of claim 8 wherein:
said first and second leg members are generally parallel when clamping the fibers; and
said means for blocking flow of said gel comprises rail means attached to said inner surface of one of said leg members proximate the fiber interface.

10. The article of claim 9 wherein:
said means for holding a fiber between said first and second leg members comprises a groove formed in said inside surface of said first leg member; and
said rail means comprises first and second rails formed on said inside surface of said second leg member, said rails being generally parallel with said groove and positioned on said inner surface of said second leg member whereby, when said first and second leg members are in a clamping state, said rails forcibly impinge on said inner surface of said first leg member on either side of said groove, providing an environmental seal.

11. An article for splicing two optical fibers together, comprising:

a splice element having a hinge defining first and second generally planar legs, said splice element and legs having inside and outside surfaces;
said first and second legs having means for holding a fiber therebetween;
refractive index matching gel disposed on said inside surfaces of said first and second legs; and
means for minimizing pressure differentials between said inner and outer surfaces of said splice element proximate an interface between the fibers.

12. The article of claim 11 wherein:
said means for holding a fiber between said first and second legs comprises at least one groove formed in said inside surface of one of said legs; and
said means for minimizing pressure differentials comprises a vent hole through said splice element proximate said groove.

13. The article of claim 11 wherein said vent hole extends through said hinge of said splice element.

14. The article of claim 12 wherein said splice element further has a vent channel formed therein providing fluid communication between said vent hole and said groove.

15. The article of claim 13 wherein said vent hole is in the center of said splice element.

16. An article for splicing two optical fibers together, comprising:
a ductile splice element having a hinge defining first and second generally planar legs, said splice element and legs having inside and outside surfaces;
said first and second legs having means for holding a fiber therebetween;
refractive index matching gel disposed on said inside surfaces of said first and second legs; and
means providing a barrier to flow of said gel on either side of said holding means proximate the fiber interface.

17. The article of claim 16 wherein:
said first and second legs are generally parallel when clamping the fibers; and
said means providing a barrier to flow of said gel comprises rail means attached to said inner surface of one of said legs proximate the fiber interface.

18. The article of claim 17 wherein:
said means for holding a fiber between said first and second legs comprises a groove formed in said inside surface of said first leg; and
said rail means comprises first and second rails formed on said inside surface of said second leg, said rails being generally parallel with said groove and positioned on said inner surface of said second leg whereby, when said first and second leg members are in a clamping state, said rails forcibly impinge on said inner surface of said first leg member on either side of said groove.

* * * * *